Patented Sept. 20, 1932

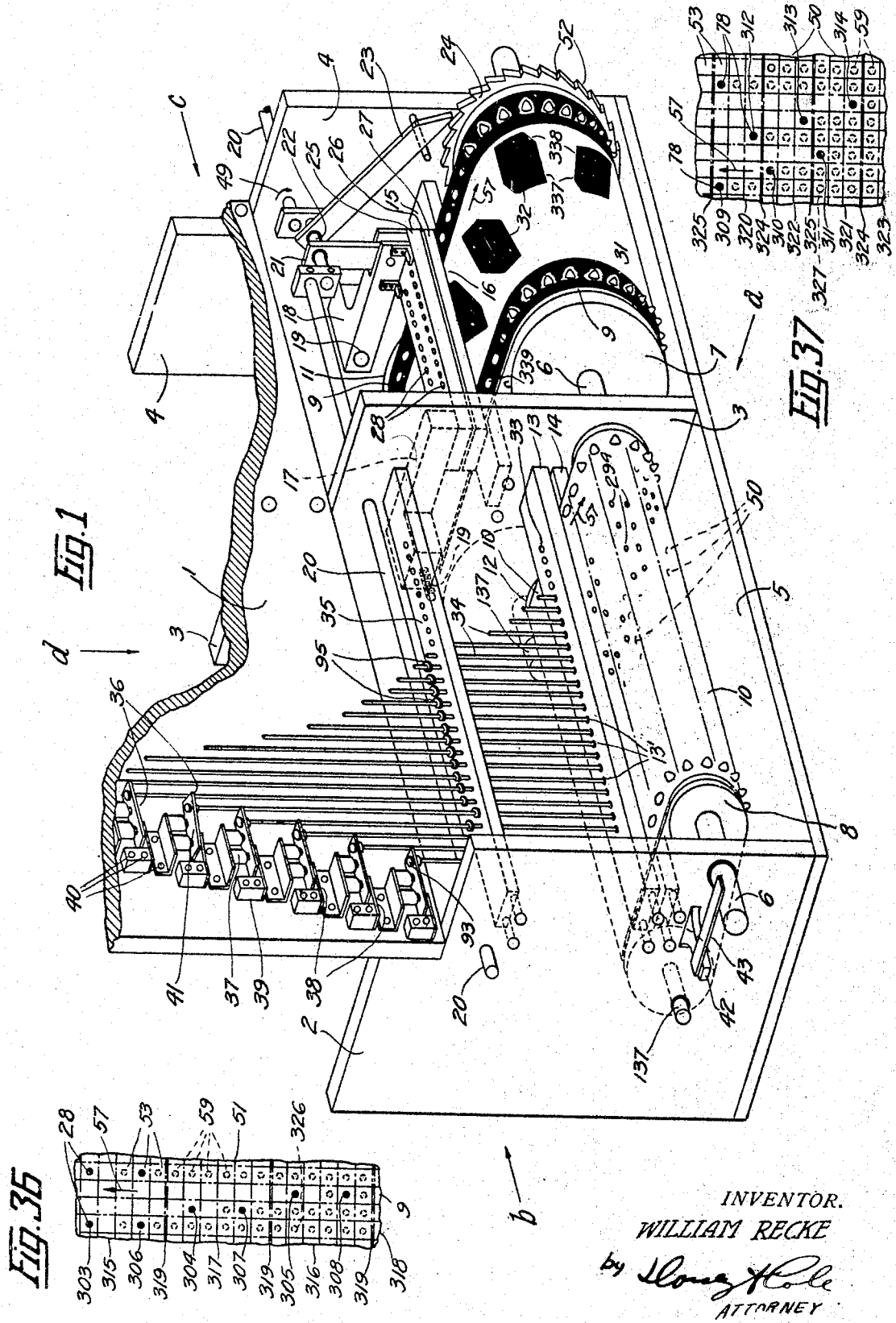

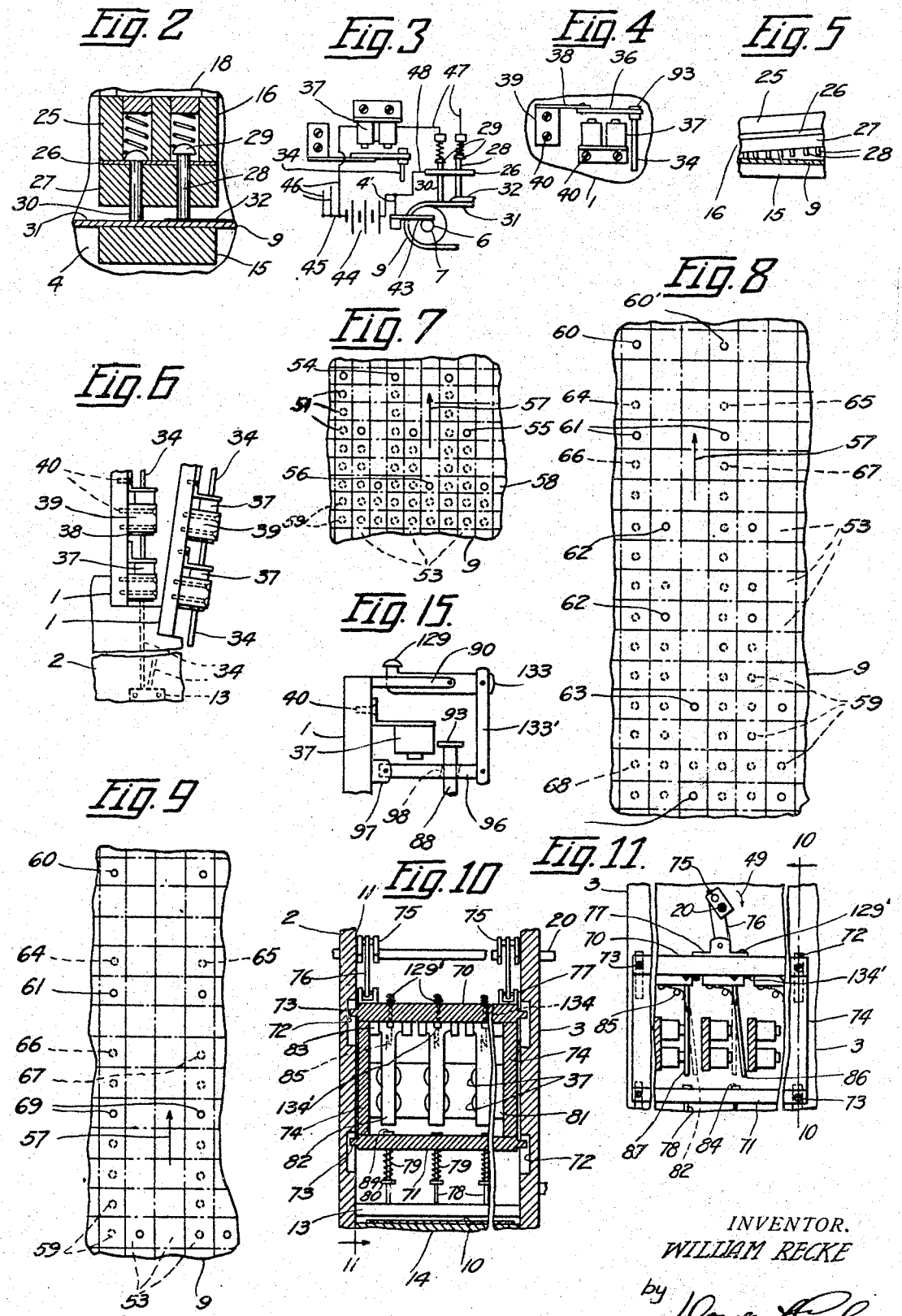

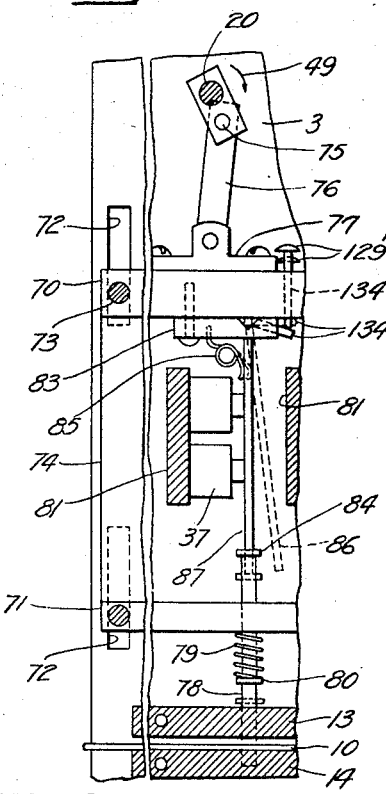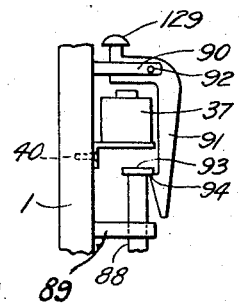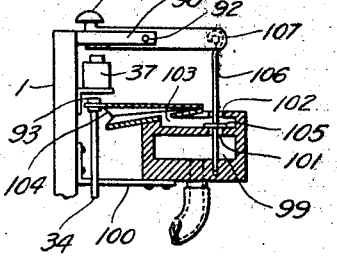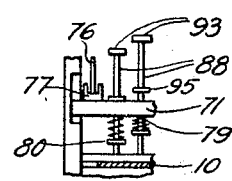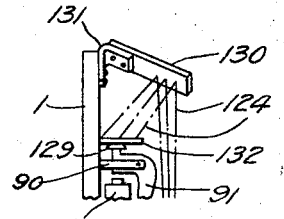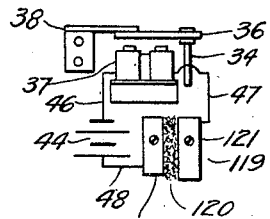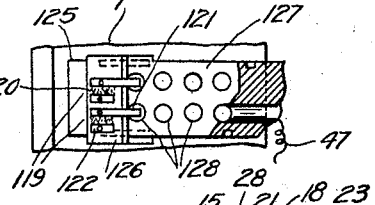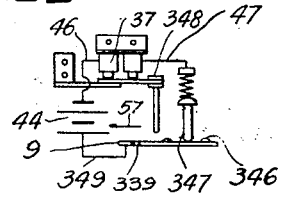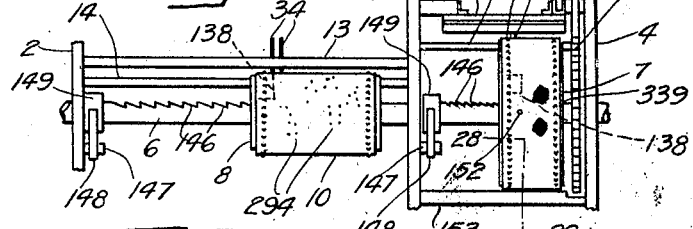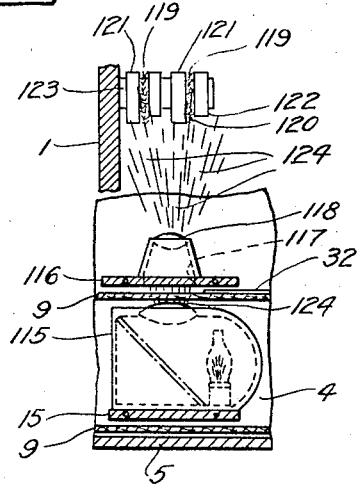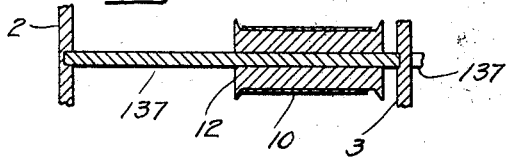

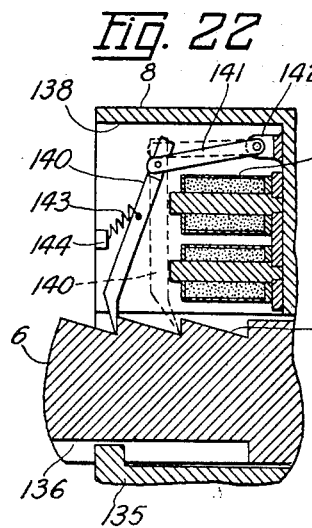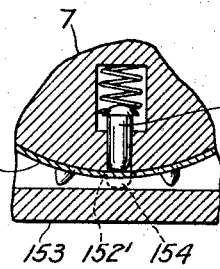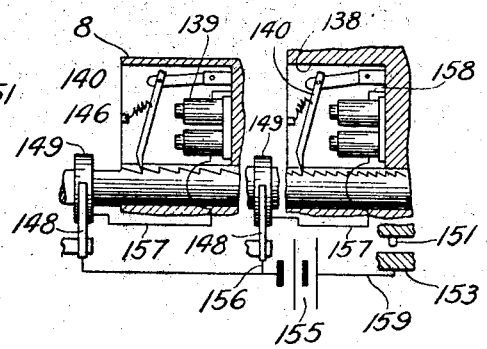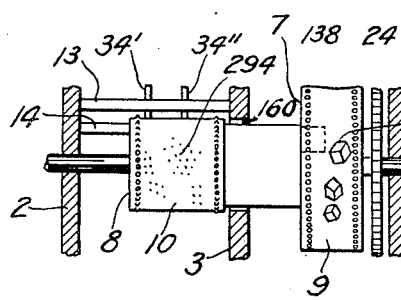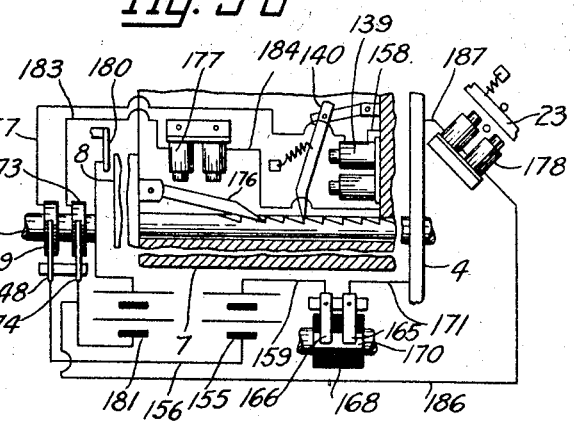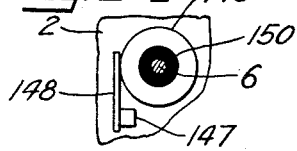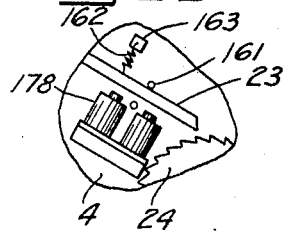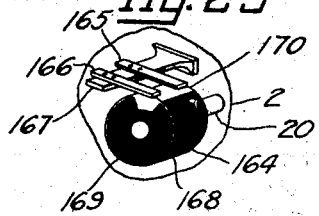

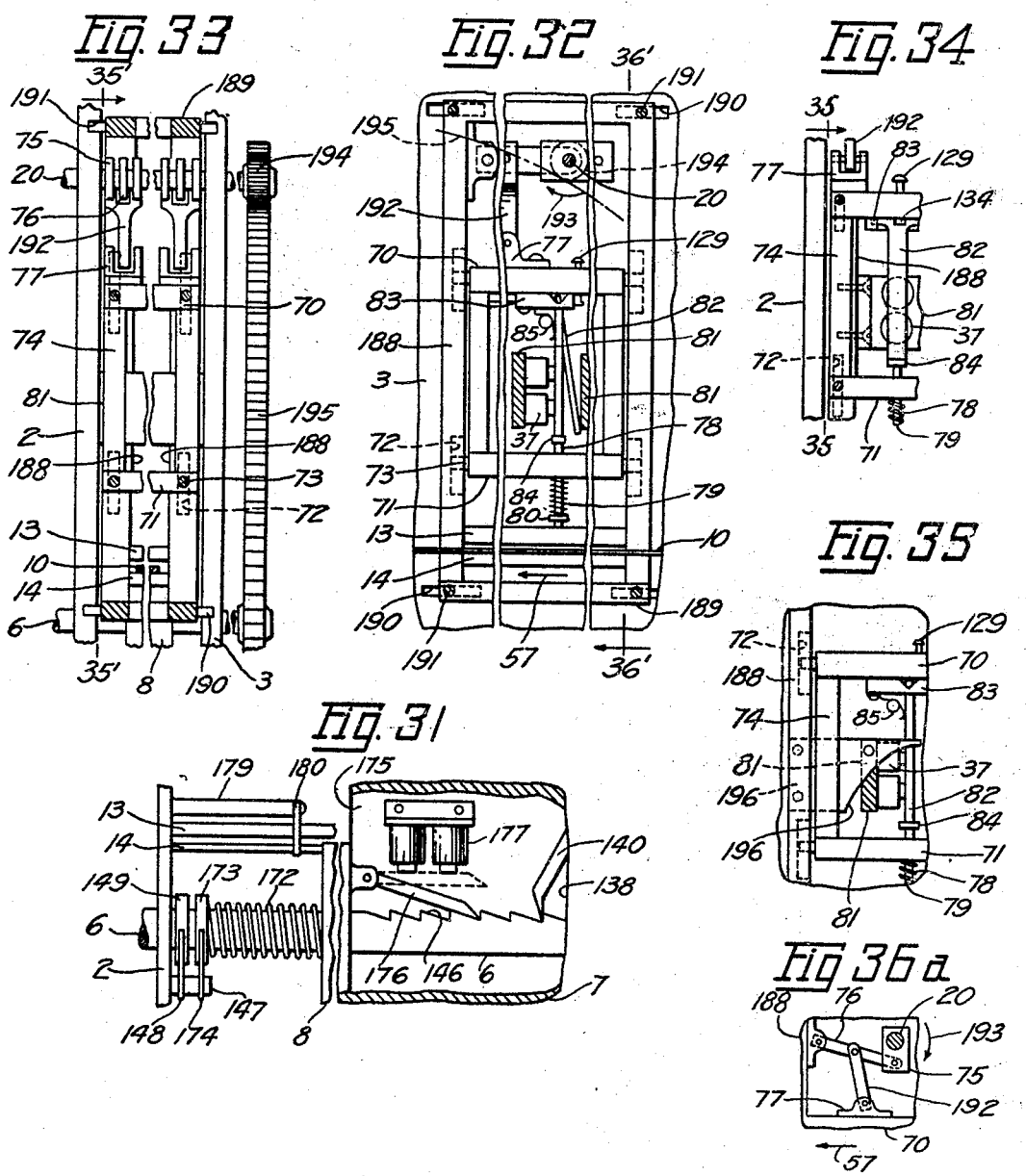

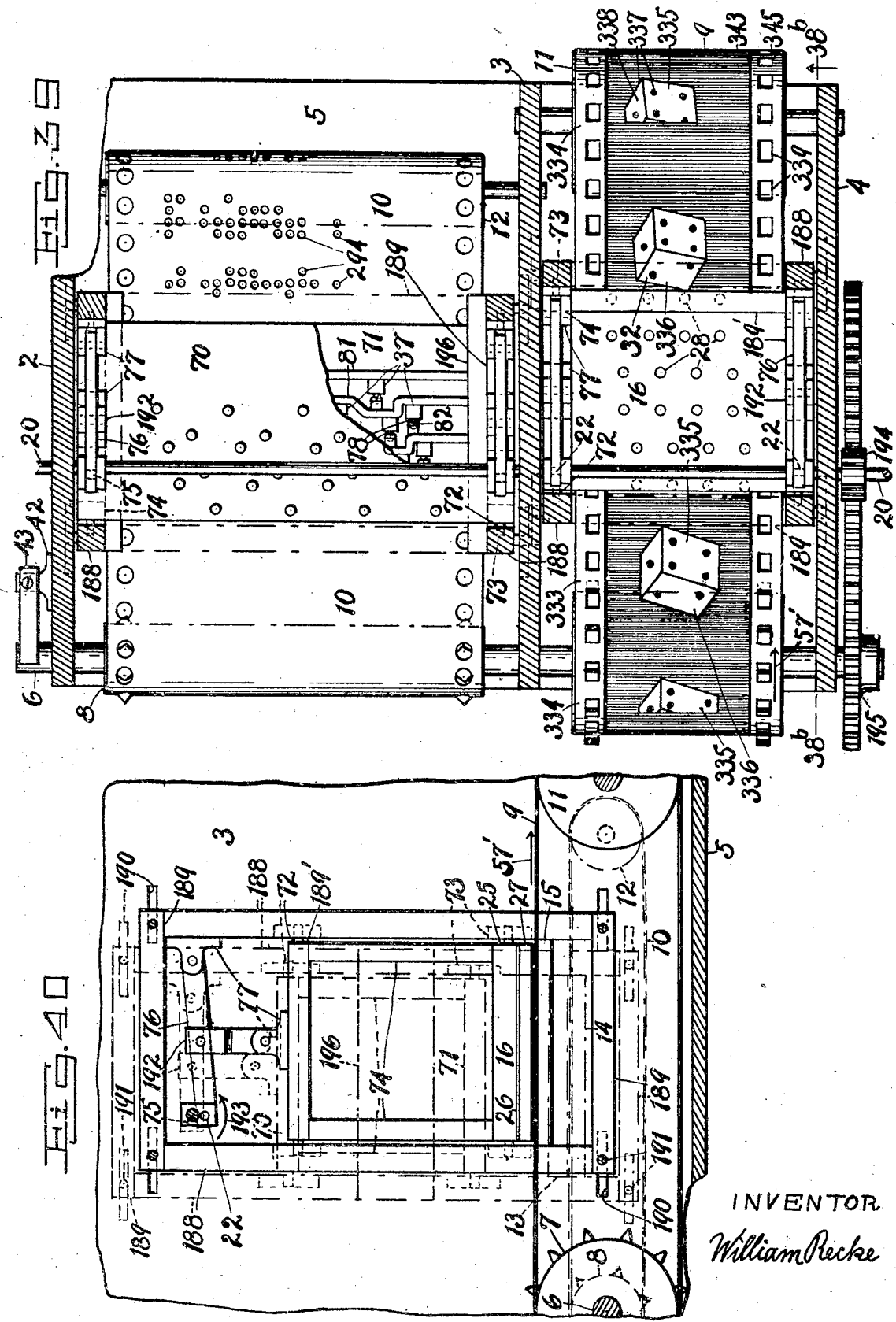

1,878,643

UNITED STATES PATENT OFFICE

WILLIAM RECKE, OF PHILADELPHIA, PENNSYLVANIA, ASSIGNOR, BY MESNE ASSIGNMENTS, TO SPRAGUE SIGNS, INC., OF WILMINGTON, DELAWARE, A CORPORATION OF DELAWARE

APPARATUS AND METHOD FOR MARKING JACQUARD TAPES

Application filed October 22, 1923. Serial No. 670,125.

This invention relates to apparatus and method for marking jacquard-tapes, and particularly of such tapes as are adapted to be employed in connection with "movie" signs, or signs consisting of indicators which may be either artificial lights adapted to be selectively lighted and extinguished, or shutters adapted to be brought into and withdrawn from sight selectively, such signs being described in Letters Patent 1,359,274 granted to me November 16th, 1920.

Practical tapes of this class are hundreds or thousands of feet long, requiring thousands or millions of markings, and it is essential that some means be provided for marking them rapidly and correctly; therefore, the production of the markings one by one, as in Belin, U. S. Patent No. 844,086, for instance, would not be sufficiently rapid to be practical, and furthermore, since the markings in Belin are applied while the tape travels past the marker, the marker will interfere with the travel of the tape, and the markings will not be placed correctly, nor will they be of a uniform and correct size. The object of my invention is to provide means for checking the relative movement between the tape and the marker during marking. Another object is to provide means whereby a bank or group of markers may operate simultaneously.

A further object of this invention is to provide means for converting the lines or patches forming the original picture to banked markings, whereby by means of a transferring-mechanism, the picture may be transferred from a film having the form of an ordinary "movie" film directly to the jacquard-tape, by means of a marking-mechanism.

Another object is to provide means for converting the comparatively square exposures of the film to elongated blocks of the tape so as to have a tape of a more convenient size.

A broad object is to provide means for marking the tape so as to enable pictures in different kinds of contrast to be displayed on a movie-sign.

A still further object is to provide automatic means in connection with manually operative transferrers for actuating the markers, thus enabling the correction by hand of a picture automatically prepared for marking.

With these and further objects in view, the invention consists in apparatus and method of the class specified and hereinafter described, reference being had to the accompanying drawings in which:—

Fig. 1 is a perspective view of one form of apparatus involving my invention;

Figure 2 is a fragmentary view, partly in section, showing the exploring elements for the film.

Fig. 3 is a diagrammatic showing and circuit arrangement of the exploring elements and punch controlling magnet.

Fig. 4 is a fragmentary side elevation showing an arrangement in which energization of the control magnets causes actuation of the punches.

Fig. 5 is a side elevation showing a slanted arrangement of the exploring members.

Fig. 6 is a side elevation showing a staggered arrangement of the actuating magnets.

Figs. 7 to 9 are diagrams showing the exploration of the film in case of various dispositions of the exploring elements.

Fig. 10 is a front view, partly in section, of an arrangement in which energization of the magnets only controls the punches, these being actuated by separate means.

Fig. 11 is a side view of the modification shown in Fig. 10.

Fig. 12 is an enlarged view of Fig. 11.

Figs 13 and 14 are fragmental side views showing a further modification of the punch actuating arrangement.

Fig. 15 is a further modification of the punch actuating arrangement.

Fig. 16 is a further modification of the punch actuating arrangement, in which the punch is operated by penumatic means.

Figs. 17 to 20 show an arrangement in which photo-electric means are used for the exploration and actuation of the punches.

Figs. 21 to 30 inclusive show a further modification of my invention for the automatic exploration of the film and the marking of the tape.

Figs. 31 to 35 and 36a relate to a further modification of my invention in which the tape is moving with the markers.

Figs. 36 and 37 are diagrammatic illustrations of an arrangement to reproduce the markings in various kinds of contrasts.

Fig. 38 is a schematic diagram showing an arrangement to produce perforations on a coated film.

Fig. 39 is a top view of an apparatus embodying my invention, which is similar to that shown in Fig. 1 except for the disposition of the exploring contacts and the punch actuating means.

Fig. 40 is a fractional side elevation of Fig. 39.

Reference being had to Fig. 1, a wall 1 is resting on supports 2, 3 and 4 connected together at the bottom by means of a base 5. A shaft 6 journaled in the supports 2, 3 and 4 carries metal drums 7 and 8 around which are passed an endless movie-film 9 and a jacquard-tape 10, respectively. A roller 11, rotatably mounted in the supports 3 and 4 holds the film 9 having the form of an ordinary movie-film, under tension, while a similar roller 12 is provided for the tape 10, between the supports 2 and 3. The supports 2 and 3 are spanned by a guide-plate 13 located directly above the tape, and a bolster 14 which opposes said plate is located directly under the tape, while a backing plate 15 is similarly located beneath the film 9. Directly above the film and opposing the plate 15 is a contact-plate 16 provided with ears 17 and 18 by means of which it is pivotally secured to the supports 3 and 4, respectively, at 19. Journaled in the supports 2, 3, and 4 above the shaft 6 is a crank-shaft 20 the connecting-rod 21 of which is pivotally secured to the ear 18. The crank 22 of the shaft 20 carries also a pawl 23 adapted to engage a ratchet-wheel 24 in such manner that at each revolution of the shaft 20, said wheel which, together with the drums 7 and 8, is tightly driven on the shaft 6 will be moved one step and will carry the film 9 and the tape 10 with it. The crank 22 and the pawl 23 are so disposed that while the film is being moved as just mentioned, the plate 16 has been raised to permit the free passage of the film.

The plate 16, also shown in Fig. 2 consists of three layers 25, 26 and 27 and is provided with two rows of spring-operated styles, exploring-elements or contacts 28 the heads 29 of which engage the layer 26 when the plate 16 is in a raised position, while when said plate is lowered, the tips 30 of the contacts will contact with either the body 31 or the picture 32 of the film 9. This film that I employ is similar to the ordinary movie-film which consists of a series of pictures each varying so slightly from its neighbor that the whole series will represent an object gradually changing, except that the body 31 of the film 9 is of electrically-conductive material.

It should be noted that the steps of advance imparted to the film 9 by the cooperation of the pawl 23 and ratchet wheel 24, and the distance between the two rows of contacts 28 bears a definite relation, whereby each element of the film is explored either by the contacts 28 of the front row of contacts or by the contacts 28 of the rear row.

The step of advance in case of two rows of contacts is in general equal to the double length of a film portion explored by a single contact 28, and the distance between the center-lines of the two contact rows is equal to one, three, five, etc. lengths of such film portion. As shall be explained, instead of having two rows of exploring contacts, a larger number thereof may be provided.

The plate 13 (Fig. 1) is provided with a row of holes 33 occupied by markers or punches 34 which are supported also by a bar 35 located above said plate, and the upper ends of said punches are secured to armatures 36 of electro-magnets 37 affixed to the wall 1 in such manner that the punches will be held in an upward positon when said magnets are energized, against the tension of springs 38 affixed to said armatures and also to blocks 39, which are secured to the wall 1 by means of screws 40, and by means of this construction the punches 34 will descend as shown at 41 when the springs 38 are released by the deenergization of the magnets 37.

Bearing on the shaft 6 and affixed to a projection 42 of the support 2 is a brush 43.

Reference now being had to Fig. 3, when the head 29 of the contact 28 engages the layer 26 which is of conductive material, current will be free to pass from the source of energy here shown as a battery 44, through wires 45 and 46, magnet 37, wire 47, contact 28, layer 26 and wire 48, back to the battery 44. The magnet 37 will be energized and the punch 34 raised. When the tip 30 is caused to touch the body 31 of the film 9, a branch-circuit will be completed and current will pass from the contact 28 to the wire 48 also through film 9, drum 7, shaft 6 and brush 43, and the punch will be held in a raised position irrespective of said first named circuit.

During operation, the shaft 20 is continuously rotating in the direction of the arrow 49, and the various parts are so proportioned that during each revolution of this shaft the film will have moved sufficiently far to permit both rows of the contacts 28 to explore a fresh portion on the face of the film, while the tape will simultaneously have moved approximately one half of the distance so covered by said film, there being but one row of punches to explore the face of the tape. Since each of the punches must have a corresponding contact, it is evident that by means of this arrangement twice as many punches are required in a row as there are contacts in a row, and although the width of the tape will be thereby increased, its length and consequently its speed when in action, will be decreased. The punches will be held in an inoperative position so long as the contacts are alternately engaging the layer 26 of the plate 16 and the body 31 of the film, but when any of said contacts encounter the picture on the face of the film, their respective heads 29 will be momentarily disengaged from the layer 26, and since their tips 30 are simultaneously kept away from the body 31 by the insulated picture 32, the respective punches which are operatively associated and electrically connected with said contacts as just described, will be released to perforate the tape. But no sooner the plate 16 begins to rise, the heads 29 involved will again engage the layer 26 and cause the extrication of the respective punches before the tape begins to move to its next position.

In jacquard-tapes of this class it is preferable to have the tape-members, blocks or divisions 50 (Fig. 1) corresponding with the exposures or film-members 51 of the film, narrow and consequently long, in order to crowd such blocks as much as possible. This crowding of the blocks is absolutely necessary when the tape is employed in connection with a movie-sign, in which instance the blocks are interchanged many times during each second in order to produce the illusion of a single, moving picture as is known to those versed in the art. There is not much difference between the width and the length of an exposure of a movie-film. In Fig. 1, I have shown the tape 10 as having twice the width of the film 9, which construction permits me to reduce the blocks 50 to one half the width of that of the exposures 51, so as to change the proportions of the width and the length of the blocks with respect to the proportions of width and length of the exposures and convert the relatively square exposures to elongated blocks, and for this reason I have shown the punches 34 as being placed in a single row while the respective contacts 28 are in two rows, with the result that the parts constituting the picture will be arranged differently on said blocks than they are arranged on said exposures.

Instead of causing the perforation of the tape when the contacts encounter the picture 32, as aforesaid, contact between the tips 30 of the contacts and the body 31 of the film will cause such perforation if the construction shown in Fig. 4 is adopted, in which instance the punches 34 will be depressed against the tension of the springs 38 when the magnets 37 are energized. In this case, the layer 26 (Fig. 1) should be of insulating material so that the magnets will be "dead" when the plate 16 is raised.

Instead of causing all of the contacts to touch the film simultaneously as aforesaid, the plate 16 may be so placed as to be on a slight angle as shown in Fig. 5, in which instance the selected punches will perforate the tape in succession and will be extricated in the same way, as is evident, whereby the strain on the bolster 14 and on the plate 13 will be materially reduced.

It is evident that instead of one row of punches, two such rows may be provided as shown in Fig. 6, in which instance there should be four rows of contacts in the plate 16 instead of the two rows shown in Fig. 1, and the number of teeth 52 of the wheel 24 should be so proportioned as to cause the film and the tape to move twice the distance hereinbefore described, at each revolution of the shaft 20.

It will be noted that in order to crowd the punches in the plate 13, they must be of various lengths as shown in Fig. 1 to accommodate the relatively large magnets 37. In Fig. 7, a method is shown whereby the punches may be separated so far as to permit of the placing of the magnets side by side and at the same time obtaining the result as though said punches were crowded together. Presuppose that the squares 53 shown in this figure were each a point or part on the tape 10 to be reached by one of the punches 34: the punches are placed at every third point, or three times as far apart as they would be when crowded together as aforesaid. Instead of one row of punches as shown in Fig. 1, or two rows as indicated in Fig. 6, they may be in three rows 54, 55 and 56, each successive row staggering by one point to the right with respect to the preceding row, according to the arrangement indicated in Fig. 7. It is evident that if the tape is caused to move in the direction of the arrow 57 and to stop at each row of squares or points 53, by the time the row 54 of the punches 34 explores the row of points 53 shown at 58, every point of the tape will have been explored across its entire width and the punches will have explored every point indicated by a dotted circle 59, although certain points will have been covered by any of said punches at any one time. The points or squares 53 are preferably evenly divided and arranged to form transverse and longitudinal lines, the row 54 of punches, for instance, being all placed over one transverse line, while the longitudinal lines are arranged in the line of movement of the tape indicated by the arrow 57. The space between the contacts may be similarly widened, and if the arrangement shown in Fig. 8 is employed, there will be six rows of contacts 28 in the plate 16 instead of the two rows shown in Fig. 1. The rows 60, 61, 62 and 63 of contacts are separated by three points or parts 53 which are arranged similarly to the points of the tape, aforesaid. The first two rows 60 and 61 are opposing each other, the next two rows 62 are displaced by one point, and the last two rows 63 stagger still more, being displaced by two points with respect to the rows 60 and 61. The film 9, moving in the direction of the arrow 57, stops at every other point, skipping one point at every step just as in the construction described in connection with Fig. 1, so that the contacts 28 indicated at 60 and 60' in Fig. 8, for instance, will be located at 64 and 65, respectively, after the first step, at 66 and 67 after the second step etc., the remainder of the contacts simultaneously taking up similar positions as is indicated by the circles 59, and by the time the film has moved so far that the contact shown at 60 is located at the point shown at 68 which will happen after the seventh step, the whole width of the film will have been explored. Since the tape stops at every square 53, and the film at every alternating square, as just described, it is evident that the width of each block 50 (Fig. 1) will cover half the number of squares covered by the width of the corresponding exposure 51, and for the same reason, the row 54 (Fig. 7) for instance, of the punches 34 will have to cover twice as many squares as the row 60 of styles covers, in order to have a punch for every style as is also provided in the construction shown in Fig. 39, to be hereinafter described. It is evident that this method is not limited to the spacing shown in Figures 7 and 8, and if the rows 60 and 61 of the contacts 28, instead of being separated by three points as shown in Fig. 8 are separated by five points, substantially the same result will be obtained. If three opposing rows are provided instead of the two rows 60 and 61, the film must consequently be caused to move by three points instead of by two, at every step, and the rows 60, 61, etc. may be separated by four points, for instance, in which case the result will be as is indicated in Fig. 9 in which the first three rows of contacts 28 are denoted as 60, 61 and 69, and a careful examination of this figure will show that from the time at which the contact shown at 60 becomes located at 66, which will happen after the second step, every point of the film in line with the contacts shown at 60, 61 and 69 will have become covered by one or another of these contacts. The film may be moved by any desired number of points during each aforesaid movement or step of the tape in various well known ways, and in the construction hereinbefore described in connection with Fig. 1, it is only necessary to change the proportion of the diameter of the drum 7 with respect to that of the drum 8, so that if the arrangement shown in Fig. 9 is adopted this proportion will be as three to one. In some instances the drums are placed on separate shafts driven by a source of power common to both, and in U. S. patent to Carbonell, No. 979,128, the film or design sheet is movably connected with the tape of card-chain by a worm and toothed wheel, and by varying the size of the wheel, the manner of movement of said sheet with respect to said chain is changed. The method of separating or spacing the contacts is of great advantage when it is desired to transfer to jacquard tapes pictures so concentrated as they are on movie-films.

In case the jacquard tape 10 is of metal and of substantial hardness, to move the punches bodily by means of electro-magnets as aforesaid, such magnets must be powerful and consequently costly. In this case I provide crank-operated mechanism for depressing the punches, and employ the magnets only for selecting the punches. In the construction shown in Figs. 10 and 11, plates 70 and 71 are slidably mounted in vertical grooves 72 provided in the supports 2 and 3, by means of pins 73 which are provided at the corners of said plates, these plates being connected together by posts 74. The shaft 20 is provided with additional cranks 75, the connecting rods 76 of which are pivotally secured to flanges 77 affixed to the plate 70 so that when said shaft revolves, the plates 70 and 71 will reciprocate. The plate 71 is similar to the bar 35 (Fig. 1) and supports punches or marking-elements 78 similar to the punches 34, aforesaid, except that the punches 78, the lower ends of which are supported in the stationary plate 13 which is directly above the tape as hereinbefore described, terminate abruptly directly above the reciprocating plate 71 and are provided with springs 79 held under tension and against said plate by means of rings 80 which are driven on said punches, the function of the springs being to hold the punches in a downward position. The magnets 37 are in this instance secured to bars 81 which may be secured to the supports 2 and 3 in a similar manner as is so secured the plate 13 in the construction described in connection with Fig. 1. The armatures 82 (Figs. 10 and 11) of the stationary magnets are pivotally secured to flanges 83 provided beneath the movable plate 70, in such manner that the lower ends of said armatures 82 are directly above the heads 84 of the punches 78. Springs 85, driven into the flanges 83, tend to displace and hold the armatures 82 out of line with the punches 78, as shown at 86, while when the magnets are energized, said armatures will be placed in line with said punches and will assume the position shown at 87, that is to say their position will be at right angles with respect to the tape 10. The various cranks of the shaft 20 may be so set that the various movable parts of the marking- or perforating-mechanism assume the position shown in Figs. 10 and 11 while the transferring-mechanism is in the position shown in Fig. 1, at which time such of the contacts as are touching the body 31 of the film will cause the energization of the corresponding magnets and the consequent movement of the respective armatures 82 to the position shown at 87 in Fig. 11. When during the rotation of the shaft 20 the plates 70 and 71 begin to lower, the punches 78 cease to lower with those plates when they strike the tape 10, but since the armatures 82 which reciprocate together by reason of the fact that they are all secured to one of said plates as aforesaid continue to lower with said plates, they will, strike the punches immediately thereafter, provided such armatures are attracted by their magnets and selectively displaced while passing said magnets as just stated, otherwise such armatures will miss their respective punches. Although the plate 16 (Fig. 1) will now be raised to an extent so as to disconnect the contacts from the film, the friction between the actuated armatures and their respective punches will hold such armatures in their actuated position until the plates 70 and 71 have reached the bottom as is shown in Fig. 12, after which said armatures upon upward movement of the plate 70 and under action of the springs 85 will assume the position shown at 86, the respective punches will be extracted by reason of their heads 84 engaging the plate 71 and will be returned to their normal position under the action of the springs 79, and the shaft 6 will be moved one step by means of the ratchet-wheel 24 and pawl 23 as aforesaid. This construction is especially adapted to be employed in connection with the method of arranging the contacts and the punches shown in Figs. 7 to 9 and hereinbefore described. It is evident that if the plate 70 (Fig. 10) is so constructed as to be tilted, as is so tilted the plate 16 with respect to the film 9 in the construction described in connections with Fig. 5, the armatures 82 (Fig. 10), being thereby situated one nearer than another to the respective punches 78, will cause the depression of said punches in succession, and if the plate 71 is also caused to tilt, said punches will be extracted in succession as well.

In the construction shown in Figs. 13 and 14, the supports 77 to which the rods 76 are secured are affixed directly to the plate 71, the plate 70 is omitted, and punches 88 similar to the punches 34 are employed. The upper end of each punch 88 is supported by a projection 89 of the wall 1 which is provided with an additional projection 90 acting as a support for a bent lever 91, and this lever has its pivotal point at 92 and normally holds the punch in an upward position by means of its head 93 and a hook 94 of the lever 91, as shown in Fig. 14. This lever 91 acts also as an armature for the magnet 37 which is so affixed to the wall 1 as to pull the upper end of said lever downward when energized, which action will cause disengagement of the hook 94 from the head 93 and will cause the punch 88 to drop. The cranks 22 (Fig. 1) and 75 (Fig. 12) should be so set that when the plate 16 is in its actuated position as shown in Fig. 1, the plate 71 will be in its lowered position as shown in Fig. 13, in which position the springs 79 have been compressed to their utmost capacity and will act to force the punches 88 through the tape 10 when the levers 91 are actuated as just described. Thus in its downward movement the plate 71 compresses the springs 79 against their collar 80 and tends to depress the punches. However only those punches are actually depressed the heads 93 of which have been released by their hooks 93 upon energization of their respective magnets. As the plate 71 is raised, the actuated punches are extracted by their collars 95, and lifted to such height as to cause their heads 93 to pass above the hooks 94 and to become locked there as shown in Fig. 14.

The lever 91 may be substituted by a friction-latch 96 a simple form of which is shown in Fig. 15 which shows the punch 88 as loosely mounted in the latch 96 which is pivotally secured to a projection 97 of the wall 1. The hole 98 for the reception of the punch 88 is drilled on an angle in the latch 96, so that when said latch drops until all lost motion between the punch and the hole 98 is taken up, the latch will assume the position shown and will grip the punch so as to prevent its downward movement when the plate 71 (Fig. 13) is lowered as aforesaid. As is well known, the function of latches of this kind is such that after the lost motion is taken up as aforesaid, at a slight endeavor to lower the punch the latch will tend to swing around its pivot shown at 97 and to tighten its grip on the punch, while a slight endeavor to raise the latch will readily release the punch for the same reason. In this construction, the magnet 37 is situated directly above the latch, and it is evident that if this latch be of iron, said magnet upon energization will attract it and will lessen the friction between latch and punch to an extent as to cause this punch to drop.

The punches may be operated by pneumatic means, well known and old in the art. As an example, in Fig. 16, I have shown the vacuum chamber 99 as affixed to the wall 1 by means of brackets 100 and as having valve holes 101 and 102 and a duct 103, for each pneumatic or bellows 104 to which the punch 34 (Fig. 1) is secured. The valve 105 (Fig. 16) is so placed as to normally close the hole 101 and is pivotally secured by means of its stem 106 to a rocker 107 which in turn is pivotally secured to the projection 90, and this rocker forms the armature for the magnet 37 which is located directly below, and it is evident that when the magnet is energized, the valve 105 will be lifted off the hole 101 to close the hole 102 and the suction of air from the pneumatic 104 to the chamber 99 through said duct 103 and said hole 101 will close the pneumatic, and lower the punch 34.

In Figure 17, I have shown a construction whereby the objects in view may be obtained by means similar to those employed by Belin, aforesaid. The usual dark-chamber 115 is placed directly under the film 9 on the plate 15 which, in this case, is placed low down to accommodate said chamber. The plate 16 (Fig. 1) is omitted and substituted by a plate 116 which is similar to the plate 15 and is similarly mounted. This plate 116 has a hole 117 over which the usual lens-piece 118 is placed. Photo-electric cells 119, each composed of selenium 120 placed between conductors 121 and 122, are secured to projections 123 of the wall 1 and replace the contacts 28 of the discarded plate 16 (Fig. 1). Reference being had to Fig. 18, the electrical connections are such that when the resistance of the cell 119 is sufficiently reduced, enough current will be free to pass from battery 44, through wire 46, magnet 37, wire 47, conductor 121, selenium 120, conductor 122, and wire 48, back to the battery 44, to attract the armature 36 and throw the punch 34. If the film 9 is of transparent material as is the ordinary movie-film, the rays 124 (Fig. 17) will penetrate it, and will act on the cells 119, except on such of these cells as will be focally opposite the picture 32. Although rays 124 corresponding to the entire exposure may issue through the lens 118, only those striking the two series of cells 119 will be effective, as is evident.

Where individual photo-electric cells are objectionable on account of their high cost, a bar 125 shown in Fig. 19 as forming a projection on the wall 1 may be substituted for the projections 123 just described, and a single pair of cells 119 may be mounted on a carriage 126 adapted to slide along said bar 125 so that the conductors 121 will ride over the face 127 of said bar and will serially engage contacts 128 mounted in this bar. The wires 47 are in this instance connected with the contacts 128 instead of with the conductors 121 (Fig. 18), and it is evident that if the carriage 126 (Fig. 19) is passed along the bar 125 and through the field of rays 124 (Fig. 17), the magnets 37 (Fig. 18) will be energized so as to actuate their respective punches 34 when the conductors 121 touch the corresponding contacts 128 while the cells 119 are passing a brightly illuminated spot on the bar 125 (Fig. 19).

Reference again being had to Fig. 14, the levers 91 are provided with manually operable transferrers or push-buttons 129 which, when depressed will cause disengagement of the hooks 94 from the heads 93 irrespective of the energization of the magnets 37, aforesaid. The rays 124 issuing from the dark chamber 115, (Fig. 17) may be utilized for guiding the depression of the proper buttons 129 if instead of causing said rays to strike the cells 119 as just stated, they are reflected by means of a mirror 130 shown in Fig. 20 and secured to the wall 1 by means of a bracket 131 so that the rays will strike a sheet of paper 132 laid across the buttons 129, for instance, and it is only necessary to depress the sheet 132 and underlying button wherever there is a shadow caused by the picture 32 of the film 9, which action will operate the buttons 129 thereunder, and their respective punches 34. Again, the depression of the button 129 shown in Fig. 15 will rock the lever 133 to raise the link 133' which is pivotally connected therewith and with the clutch 96, whereby the clutch 96 will be raised, and the punch 34 dropped. If the buttons 129' shown in Figures 10 to 12 are pushed, their stems 134 which are mounted in the plate 70 and rest on projections 134' of the armatures 82 as best seen in Fig. 12, will bear upon said projections 134' and will bring said armatures to the actuated position shown at 87, so that the next downward movement, aforesaid, of the last said armature will cause the depression of the corresponding punches 78.

A single pair of either photo-electric cells or electric contacts may be operated automatically in various ways. In the construction shown in Fig. 21, the plate 16 requires only one pair of contacts 28, and the plate 13 only two punches 34. The drums 7 and 8 are in this instance loosely mounted on the shaft 6, but are compelled to rotate with said shaft by a key-135 and keyway-136 arrangement shown in Fig. 22, and these drums are so short with respect to the space between the supports 2, 3 and 4 as to permit of endwise movement of the drums on said shaft. The rollers 11 and 12 (Fig. 1) are slidable in connection with their respective drums 7 and 8, in this instance, the roller 12 being shown in Fig. 23 as loosely mounted on its shaft 137 which is supported by the supports 2 and 3.

The endwise movement of the drums is accomplished by mechanisms provided in openings 138 of both drums 7 and 8, and each consisting of an electromagnet 139 the armature 140 of which is pivotally secured by means of a link 141 to a projection 142 in the opening 138 as shown in Fig. 22. A spring 143 which is attached to a projection 144 of the opening and also to the armature 140, tends to hold said armature away from the magnet 138 and within reach of angular teeth 146 cut in the shaft 6, and it is evident that when this magnet is energized its armature 140 will assume the dotted position, whereby the respective drum will be moved by one tooth 146. To projections 147 of the supports 2 and 3 are secured brushes 148 which bear on collector rings 149 secured to, but insulated from the shaft 6 as indicated at 150 in Fig. 24. A spring-operated contact 151 is imbedded in the drum 7 as shown in Fig. 25 and is normally held within said drum by the film 9 which in this instance is provided with a hole 152 (Fig. 21) corresponding with said contact 151, and directly beneath the drum 7 and film 9 is located a metallic plate 153 adapted to be touched by this contact as indicated at 154 in Fig. 25, when during the travel of the film the hole 152 has moved to the position indicated at 152'.

Reference being had to Fig. 26, the parts described are so wired that if the contact 151 is allowed to touch the plate 153, current will be free to flow from an additional battery 155, through wires 156, brushes 148, rings 149, wires 157, magnets 139, wires 158, drums 7 and 8 which are electrically connected together by means of the shaft 6, thence through contact 151, plate 153, and wire 159, back to the battery 155. When during operation the film and the tape have travelled once around, and the hole 152 has moved into position to register with the contact 151 and consequently to release said contact, the magnets 139 will be caused to attract their armatures 140, whereby the drums 7 and 8 will be moved to the left by one tooth 146, whereafter the contacts 28 and the punches 34 will be in position to explore a new portion of the film and the tape, respectively, around their entire length by means last described. If the drums 7 and 8 are joined together as shown in Fig. 27, which is done by providing an opening 160 in the support 3 large enough to admit the drum 8, the mechanism situated in the opening 138 of the drum 7 will move both drums 7 and 8. In this construction, the punches 34 are separated so far that the left side of the tape 10 will be explored by the punch shown at 34' while the right side is simultaneously explored by the punch shown at 34", as will be understood.

Instead of applying two series of markings around the entire length of the tape, and then shifting it so as to produce two adjacent series of markings, as just described, a series of such markings may be applied at right angles to that just described, that is to say, from edge to edge of the tape, after which another such series may be so applied, etc., so that one block 50 of the tape 10 will be completely marked before the marking of another is begun. To produce this result, the pawl 23 (Fig. 21) is held away from the ratchet-wheel 24 and against a stop 161 by means of a spring 162 which is affixed to said pawl 23 and also to a projection 163 of the support 4, as shown in Fig. 28, so that when the shaft 20 (Fig. 1) is rotated, the shaft 6 will be idle. The contact 151 and the plate 153 are omitted in the circuits for shifting the drums 7 and 8, described in connection with Fig. 26, and substituted by a rotatable switch 164 shown in Fig. 29 as secured to the crank shaft 20, brushes 165 and 166 therefor being affixed to a projection 167 of the support 2. The switch 164 is so set with respect to the crank 22 that when said crank is in the position shown in Fig. 1, the brushes 165 and 166 (Fig. 29) will rest on an insulating portion 168 of said switch and at 169, while when this switch is in the position shown, said shaft 20 will have revolved until the plate 16 (Fig. 1) is in a raised position as hereinbefore described, and while in this position, the brushes 165 and 166 (Fig. 29) will be electrically connected together by a conductive portion 170 of this switch, and the drum-shifting circuit will be closed as shown in Fig. 30, current now passing from battery 155, through wire 156, brush 148, ring 149, wire 157, magnet 139, wire 158, drum 7, shaft 6, support 4, wire 171, brush 165, portion 170, brush 166, and wire 159, back to the battery 155. This will cause the drums to take a step sidewise as hereinbefore described. During further rotation of the shaft 20, the plate 16 will again bear down on the film when the brushes 165 and 166 have reached the portion 168 to break the last named circuit, after which the portion 170 will again be in position to close this circuit and the drums will be moved another step, etc. until one line of points 53 of the tape is selectively perforated by means hereinbefore described in connection with Fig. 27. A spiral spring 172 shown in Fig. 31 is passed over the shaft 6 and wedged in between the drum 8 and a collector-ring 173 which is exactly like the ring 149 and the brush 174 for which is also secured to the projection 147, and in order to resist the pressure on the drums 7 and 8 exerted by this spring 172, the opening 138 of the drum 7 is extended at 175 and houses a pawl 176 so as to cause said pawl to normally engage one after another the teeth 146 of the shaft 6 during the shifting of the drums, aforesaid. An electro-magnet 177 is also mounted in the extension 175 in such manner as to attract the pawl 176 to disengage it from the teeth 146. An additional electro-magnet 178 is mounted on the support 4 and below the pawl 23 (Fig. 28) so as to cause engagement of the wheel 24 by said pawl when said magnet is energized. To a projection 179 of the support 2 (Fig. 31) is secured a metal bumper 180 adapted to engage the drum 8 when the entire width of the film and of the tape are explored as aforesaid. Reference being again had to Fig. 30, if the bumper 180 is caused to touch the drum 8, current will flow from a new battery 181, through wire 182, brush 174, ring 173, wire 183, magnet 177, wire 184, drums 7 and 8, bumper 180, and wire 185, back to the battery 181. This will energize the magnet 177 and lift the pawl 176 from the shaft 6. A branch-circuit will also be completed, and current will flow from the wire 182 to the drum 8 also through wire 186, magnet 178, wire 187, support 4, and shaft 6, whereby the magnet 178 will also be energized, and the pawl 23 caused to descend. During operation, when the drum 8 has been shifted so far as to bump the bumper 180, the pawl 176 is raised and the drums 7 and 8 are thrown backward by means of the spring 172, and the parts involved are so proportioned that by the time the pawl 176 has descended sufficiently to engage a tooth 146 of the shaft 6, the drums will have retreated to their limit. Simultaneously with the retreat of the drums they are also given a step forward as a result of the descending of the pawl 23 to the wheel 24, so that when said drums resume their shifting function by means of the magnet 139, a fresh line of points on the tape will be explored.

The transfer of the desired "movie" from film to tape will be materially hastened if the markers are caused to follow the tape. Such construction is shown in Figs. 32 and 33, which show also a part of the construction hereinbefore described in connection with Figs. 10 to 12. The plate 13 and the bolster 14, instead of being affixed to the supports 2 and 3 as shown in said Figs. 10 to 12, are supported by posts 188 (Figs. 32 and 33) which are braced at top and bottom by cross-pieces 189, the whole being horizontally slidable in grooves 190, provided in the supports 2 and 3, by means of pins 191 provided on said cross-pieces. The plates 70 and 71, instead of being slidably mounted between the supports 2 and 3 as aforesaid, are so mounted between the posts 188, while the connecting-rods 76, instead of being secured to the plate 70, are similarly secured to the posts 188 and are also pivotally secured to forked links 192 the lower ends of which are pivotally mounted in the supports 77, aforesaid. By this means, when the shaft 20 is rotated in the direction of the arrow 193, the mechanism having the plates 70 and 71 with the armatures 82 and punches 78 will move downward until said shaft is in the position shown in Fig. 36a, and the whole framework including the plate 13 and the bolster 14 which is vertically stationary or immovable as hereinbefore described will move horizontally in the direction of the travel of the tape 10, indicated by the arrow 57. It is obvious that since the perforations are made during the travel of the tape, the markers or punches will move or reciprocate in cross directions and the armatures will have a likewise movement. It will be understood that this movement occurs only during one half of each revolution of the shaft 20, and that during the remaining half revolution the markers will move back to their starting point while the tape continues on its travel, whereby a relative movement between markers and tape will be produced and maintained until a fresh portion of the tape is covered by said markers. The travel of the tape is caused by means of a pinion 194 provided on the shaft 20 and meshing with a gear 195 provided on the shaft 6, and the proportionate sizes of gear and pinion are such that during the time the punches 78 selected by means of the magnets 37 are piercing the tape, the speed of the punches and of the tape will be practically the same. Although the bars 81 that carry the magnets 37 are shown as immovable in this construction, they may be caused to move with the plate 70 having the armatures 82 for said magents, if braces 196 are affixed to the posts 188 as indicated in Figs. 34 and 35. In this construction, the bars 81 are affixed to the braces 196 instead of to the supports 2 and 3. In the modified forms just described in connection with Figs. 35 to 38, the pawl 23 should be made inoperative as by means of the spring 162 shown in Fig. 28, and it will be noted that since here the film travels uninterruptedly, the contacts 28 will engage said film in a sliding manner; but this sliding contact will be prevented if the plate 16 is caused to move with the film just as the plate 13 having the punches 78 is caused to move with the tape. Apparatus for producing this result is old in the art and is also described in Letters Patent No. 1,359,274, aforesaid. A simple form of apparatus in which the plate 16 having the contacts 28 is adapted to move with the film 9 by substantially the same means as the plate 13 having the punches is adapted to follow the tape 10 as aforesaid, is shown in Figs. 39 and 40 in which is illustrated my preferred form of perforator embodying the principle hereinbefore described in connection with Figs. 2, 34 and 35. In said Figs. 39 and 40, I have shown the frame-work consisting of the posts 188 and the cross-pieces 189, horizontally slidable between the supports 2 and 3 as aforesaid, and have shown a similar frame-work similarly mounted between the supports 3 and 4; the frame-work consisting of the posts 74 and the plates 70 and 71, vertically slidable in said first named frame-work as aforesaid, and a frame-work similar to said last named frame-work and similarly mounted in said second named frame-work, except that in this instance the posts 74 support the contact-plate 16 instead of the plate 71 and are connected at the top to cross-pieces 189′ instead of to the plate 70. The frame-works having the plate 16 are adapted to be moved by means of connecting rods 76 and links 192 similar to the rods 76 and links 192 hereinbefore described in connection with the plate 71, and by this means the contacts 28 are given movements similar to those given the punches 78, the cranks 22 and 75 of the shaft 20 being so set that the plate 16 will begin to lower before the plate 71 begins to lower as hereinbefore described in connection with Figs. 10 and 11.

As hereinbefore described and shown in Figs. 7 to 9, the coating of an ordinary movie-film may be employed to control the marking of the tape. The picture to be converted into markings may be in various kinds of contrast, as in red and green colors, for instance. It is well known in the art that one half of the number of exposures on a movie-film adapted to the production of colors are produced by means of a red filter, the alternating half being subjected to a green filter, whereby different colors of the original object are represented on different exposures, so that a certain kind of contrast will be represented on the exposures pertaining to the red filter and a certain other kind will be so represented on the exposures pertaining to the green filter. In Figs. 36 and 37, I have indicated a simple arrangement of the contacts 28, and the punches 78 (Fig. 39), respectively. Presuppose that the contacts 28 indicated at 303 to 308 in Fig. 36 have been made to correspond with the punches 78 indicated in Fig. 37 at 309 to 314, respectively; that the exposures 51 of the film 9 shown at 315 and 316 in Fig. 36 have been reserved for "red" effects while those at 317 and 318 pertain to "green" the boundary-lines being at 319; that space shown at 320 and 321 in Fig. 37 has been allotted for "red", and the space shown at 322 and 323, for "green", the imaginary boundary or division lines between "red" and "green" space being shown at 324, while those between the blocks 50 are shown at 325; that the film is to move in the direction of the arrow 57 by two points 53 at a time, and the tape, by one point, as hereinbefore described in connection with Figs. 7 and 8. By following the successive steps of the film and of the tape it will be noted that the changing of the contacts from an exposure pertaining to one color to one pertaining to the color will be coincident with the changing of the punches from and to the corresponding portions of the corresponding block, so that the two colors will be represented on a single block and that by the time six steps, for instance, have been taken, the contact 28 shown at 303 (Fig. 36) will have traversed the "red" exposure shown at 315, will have stepped from this exposure to the "green" exposure shown at 317, will have explored and left the last said exposure, will have entered the "red" exposure shown at 316, and will have stationed itself at 326, exactly at the same time as the corresponding punch 78 shown at 309 (Fig. 37) will so have crossed and left the "red" space shown at 320, entered, explored and left the "green" space shown at 322, entered the "red" space shown at 321, of the next block, and will be found at 327. The contact shown at 304 and corresponding with the punch shown at 310 as aforesaid, will have explored and left the "green" exposure shown at 317 at the third step, which will be at the same moment when the last said punch has left the corresponding "green" space 322, etc.

The pictures may be transferred directly from the negative on which openings 339 may be perforated by means illustrated in Fig. 38. In this figure, I have indicated the developed film 9 as having coated portions 346 corresponding with the openings 339 of the "negative" and have shown a contact 347 similar to the contacts 28 shown in Fig. 2, and a magnet-operated punch 348 similar to the punches 34 shown in Fig. 1. The electrical connections are such that when the parts are in the position shown, current will be free to flow from battery 44, through wire 46, magnet 37, wire 47, contact 347, film 9, and wire 349, back to the battery 44, and the punch 348 will be held away from the film 9 by means of the magnet 37. But if the film is moved in the direction of the arrow 57, the circuit will be interrupted when a coated portion 346 passes under the contact 347, whereby the magnet 37 will be de-energized and the punch will descend and punch an opening 339 in the film.

I claim:—

1. In apparatus for marking jacquard-tapes, a vertically stationary plate above a tape, a reciprocating plate above said first named plate, a plurality of markers, the lower end of each of said markers being supported in said first named plate, and the upper end in said reciprocating plate, marker-operating means, electromagnetic means for engaging said markers selectively with said marker-operating means, and means including said last named plate for disengaging said markers from said marker-operating means.

2. In apparatus for marking jacquard-tapes, a plurality of stationary electro-magnets, an armature for each of said magnets, means for causing said armatures to move past said magnets, a plurality of markers, and means for causing said armatures to be selectively attracted by their respective magnets while so passing to operate the markers.

3. In apparatus for marking jacquardtape, a plurality of electro-magnets secured to vertically stationary supports and having armatures pivotally secured to movable supports, and a plurality of markers associated with said vertically stationary supports and adapted to be operated by said armatures.

4. In apparatus for marking jacquardtapes, a plurality of armatures, markers positioned above and adapted to operate upon a tape, said armatures being adapted to be placed opposite said markers to cause the marking of said tape and to be displaced with respect to said markers to prevent the marking of such tape, said armatures being at right angles with respect to the face of the tape when so placed opposite said markers, and electromagnetic means for selectively operating said armatures.

5. In apparatus for marking jacquardtape, a plurality of markers, a plurality of armatures, means for moving said armatures toward said markers, means for causing certain of said armatures to strike certain of said markers during said movement, and means for causing certain of said armatures to miss certain of said markers during said movement.

6. In apparatus for marking jacquardtapes, a plate having armatures mounted thereon and operatively associated with electromagnets, a plurality of markers separate from said armatures, and means for moving said plate to actuate said armatures to actuate said markers.

7. In apparatus for marking jacquardtapes, a marker, an armature pivotally secured, attracted by an electro-magnet and reciprocating in cross-directions to cause selective actuation of said marker.

8. In apparatus of the class described for marking a travelling tape, a plurality of markers mounted to move in the direction of the travel of said tape and means for selectively actuating said markers to mark said tape.

9. In apparatus for marking jacquardtapes, markers directly above and adapted to mark a tape, armatures directly above, separate from and adapted to depress said markers, a plate directly above and adapted to depress said armatures, and electromagnets adapted to selectively attract said armatures.

10. In apparatus for marking jacquardtapes, markers arranged to form a block, armatures normally occupying a position in non-engagement with the markers, said armatures being separate from said markers, means for causing said armatures to reciprocate together, and electromagnetic means for displacing said armatures to engage the markers.

11. In apparatus for marking jacquardtapes, a marker constructed and arranged to operate on a tape, a travelling film, a style separate from and adapted to travel with said film, and connections between said marker and said style, said style being adapted to cause said marker during said travel to operate on said tape by means including said connections.

12. In an apparatus for marking jacquardtapes, a pattern film strip, means to continuously feed the film strip, a series of exploring elements mounted for a periodical engagement and movement with the film strip, means to continuously feed a tape, marking devices mounted for periodical engagement and movement with the tape simultaneously with the exploring elements, the movement of marking devices corresponding to the movement of exploring elements, means controlled by the exploring elements and film strip for actuating the respective marking devices, the arrangement of the marking devices relative to the tape differing in shape from the arrangement of the exploring elements relative to the film strip.

13. In an apparatus for marking jacquardtapes from a film strip, means to feed the film strip, a pair of exploring elements alined in the direction of travel of the film strip, and means to so advance the film strip by other than a multiple or reciprocal thereof of the distance between the exploring elements, that different portions of the film are covered by each element of said pair and a tape and movable marking devices controlled by said exploring elements to mark the tape in accordance with the exploration of the film.

14. In an apparatus for marking jacquardtapes from a film strip, means to feed the film strip, a pair of exploring elements alined in the direction of travel of the film strip, means to so advance the film strip that each element of said pair is brought into contact with a different strip portion from that covered by the other, and markers corresponding to said two exploring elements, said markers being alined in a single transversal line whereby when the film is advanced by two transversal lines the tape is advanced by a single line.

15. In an apparatus for marking jacquardtapes from a pattern divided into color variated fields upon a tape divided into corresponding fields, exploring members cooperating with the pattern and marking members cooperating with the tape, said members and markers forming groups whereby each group of exploring members cooperates with one of the color variant fields of the pattern and the corresponding group of markers cooperates with the corresponding field of the tape.

16. In an apparatus for marking jacquardtapes from a film strip, exploring elements mounted for engagement with the film strip and marking elements mounted for marking the tape, means to advance in unison the film and the tape in a longitudinal direction, means to shift the film strip and the tape in a transversal direction, and means to interlock the advancing means and shifting means to first cause exploration of the film and marking of the tape on a longitudinal strip and thereafter shift the film strip and the tape to cause the exploration of the film strip and marking of the tape in an adjoining longitudinal strip.

WILLIAM RECKE.